(12) United States Patent
Jeanroy et al.

(10) Patent No.: US 11,946,743 B2
(45) Date of Patent: Apr. 2, 2024

(54) SENSOR WITH MECHANICAL COMPENSATION FREQUENCY ANISOTROPY

(71) Applicant: SAFRAN ELECTRONICS & DEFENSE, Paris (FR)

(72) Inventors: Alain Jeanroy, Moissy-Cramayel (FR); Philippe Onfroy, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 182 days.

(21) Appl. No.: 17/766,909

(22) PCT Filed: Oct. 15, 2020

(86) PCT No.: PCT/EP2020/079132
§ 371 (c)(1),
(2) Date: Apr. 6, 2022

(87) PCT Pub. No.: WO2021/074346
PCT Pub. Date: Apr. 22, 2021

(65) Prior Publication Data
US 2023/0251092 A1 Aug. 10, 2023

(30) Foreign Application Priority Data
Oct. 18, 2019 (FR) ...................................... 1911721

(51) Int. Cl.
G01C 19/5712 (2012.01)

(52) U.S. Cl.
CPC ................................ *G01C 19/5712* (2013.01)

(58) Field of Classification Search
CPC ............ G01C 19/5712; G01C 19/5656; G01C 19/5705; G01C 19/5719; G01C 19/574; G01C 19/5642
See application file for complete search history.

(56) References Cited

U.S. PATENT DOCUMENTS

| | | | |
|---|---|---|---|
| 6,915,693 B2 * | 7/2005 | Kim .................... | G01C 19/5762 73/504.12 |
| 8,616,057 B1 * | 12/2013 | Mao ..................... | G01C 19/574 73/504.12 |
| 9,010,193 B2 * | 4/2015 | Walther ............. | G01C 19/5712 73/778 |
| 9,140,550 B2 * | 9/2015 | Deimerly ........... | G01C 19/5712 |
| 9,157,926 B2 * | 10/2015 | Kim .................... | G01C 19/5642 |
| 9,574,879 B2 * | 2/2017 | Chaumet ............. | G01C 19/5747 |

(Continued)

*Primary Examiner* — David J Bolduc
(74) *Attorney, Agent, or Firm* — MUNCY, GEISSLER, OLDS & LOWE, P.C.

(57) ABSTRACT

Angular sensor with vibrating resonator includes a supporting structure, a first mass and a second mass which are concentric, and mechanical springs arranged symmetrically in pairs, the pairs themselves being arranged symmetrically with respect to one another. Each spring comprises a first elastic leaf and a second elastic leaf which are connected to one another by one end, the first elastic leaf of one of the springs of each pair being parallel to the second elastic leaf of the other of the springs of the same pair. The four elastic leaves of at least one pair comprise two adjacent pairs of leaves making an angle of approximately 45° between them. The sensor is not provided with electrostatic springs.

11 Claims, 2 Drawing Sheets

(56) References Cited

U.S. PATENT DOCUMENTS

| | | | |
|---|---|---|---|
| 10,962,367 B2* | 3/2021 | Onfroy | G01C 19/5747 |
| 11,009,351 B2* | 5/2021 | Shimura | H10N 30/87 |
| 2003/0172753 A1* | 9/2003 | Geen | G01C 19/5719 |
| | | | 74/5 R |
| 2004/0123661 A1* | 7/2004 | Painter | G01C 19/56 |
| | | | 33/1 PT |
| 2006/0032308 A1* | 2/2006 | Acar | G01C 19/5719 |
| | | | 73/504.12 |
| 2006/0272411 A1* | 12/2006 | Acar | G01C 19/5712 |
| | | | 73/504.04 |
| 2007/0151332 A1* | 7/2007 | Nagata | G01C 19/5712 |
| | | | 73/65.01 |
| 2009/0188318 A1 | 7/2009 | Zarabadi et al. | |
| 2010/0319451 A1* | 12/2010 | Trusov | B23Q 17/00 |
| | | | 73/504.12 |
| 2011/0094301 A1* | 4/2011 | Rocchi | G01C 19/5712 |
| | | | 73/504.08 |
| 2014/0230549 A1* | 8/2014 | McNeil | G01C 19/574 |
| | | | 29/592.1 |
| 2014/0299947 A1* | 10/2014 | Jeanroy | B81B 3/0021 |
| | | | 438/4 |
| 2015/0211854 A1* | 7/2015 | Ruohio | B81B 3/0043 |
| | | | 73/504.12 |
| 2015/0377621 A1* | 12/2015 | Chaumet | G01C 19/5747 |
| | | | 73/504.16 |
| 2016/0146606 A1* | 5/2016 | Jeanroy | G01C 19/5747 |
| | | | 73/504.12 |
| 2018/0074090 A1* | 3/2018 | Boysel | G01D 21/02 |
| 2018/0292211 A1* | 10/2018 | Besson | G01C 19/5769 |
| 2019/0011260 A1* | 1/2019 | Onfroy | G01C 19/5769 |
| 2020/0109945 A1* | 4/2020 | Kuisma | G01C 19/5684 |
| 2020/0149890 A1* | 5/2020 | Onfroy | G01C 19/5719 |
| 2020/0263990 A1* | 8/2020 | Kuisma | G01C 19/5712 |

* cited by examiner

SENSOR WITH MECHANICAL COMPENSATION FREQUENCY ANISOTROPY

BACKGROUND OF THE INVENTION

The present invention relates to the field of inertial angular sensors.

An angular sensor is known, in particular from document WO-A-2013/308534, comprising a frame and a vibrating axisymmetric resonator including a first mass and a second mass disposed concentrically in the first mass. The masses have a square shape and are connected to an intermediate frame by mechanical suspension springs disposed in pairs at the corners of the masses. Each mechanical suspension spring comprises a first elastic leaf connected to the mass and a second elastic leaf which has an end connected to the intermediate frame and an opposite end connected to an end of the first elastic leaf, such that the second elastic leaf extends perpendicularly to the first elastic leaf. The first elastic leaves of each pair of mechanical suspension springs extend perpendicularly to one another and the elastic leaves of each pair of mechanical suspension springs extend perpendicularly to one another. The intermediate frame is connected to the frame by mechanical suspension springs, identical to those described above, such that the masses are suspended to the frame via the intermediate frame.

The manufacturing defects of the angular sensor lead to the appearance of a frequency anisotropy, that it is necessary to reduce to obtain an acceptable precision.

A solution is to act on the stiffnesses of the springs, but this solution does not make it possible to sufficiently reduce the frequency anisotropy.

Another solution is to use electrostatic springs which are controlled to compensate for these frequency anisotropies. However, compensating for the frequency anisotropy requires relatively high voltages that are incompatible with the design and precision constraints of certain applications.

SUBJECT MATTER OF THE INVENTION

The invention in particular aims for an angular sensor having a structure enabling a relatively significant physical compensation for frequency anisotropies.

SUMMARY OF THE INVENTION

To this end, an angular sensor with a vibrating resonator is provided, according to the invention, comprising a frame, a first mass and a second mass which are concentric, and means for suspending masses with respect to the frame. The masses are connected to mechanical springs arranged symmetrically in pairs themselves disposed symmetrically against one another. Each spring comprises a first elastic leaf and a second elastic leaf connected to one another by an end, and the first elastic leaf of one of the springs of each pair is parallel to the second elastic leaf of the other of the springs of the same pair. The four elastic leaves of at least one of the pairs of springs comprise two pairs of adjacent leaves, together forming an angle of around 45°. The sensor has no electrostatic spring between the elements connected by said at least one of the pairs of springs comprising the two pairs of adjacent leaves, together forming an angle of around 45°.

The elements connected by said at least one of the pairs of springs comprising the two pairs of adjacent leaves, together forming an angle of around 45° are the masses and the frame when said at least one of the pairs of springs extend between the masses and the frame and/or the elements connected by said at least one of the pairs of springs comprising the two pairs of adjacent leaves, together forming an angle of around 45° are the masses when said at least one of the pairs of springs extend between the masses. The masses have the same contribution to the frequency anisotropy for each of the specific modes of the resonator and the frequency anisotropy is adjustable with the invention by acting on the stiffness of the springs. The particular orientation of the springs according to the invention makes it possible to ensure this adjustment in several directions corresponding to the different possible orientations of the stiffness defects. It is therefore not necessary to have electrostatic springs for this purpose between the elements in question.

Other characteristics and advantages of the invention will emerge upon reading the description below of a particular and non-limiting embodiment of the invention.

BRIEF DESCRIPTION OF THE DRAWINGS

Reference will be made to the appended drawings, among which.

DETAILED DESCRIPTION OF THE INVENTION

The angular sensor described here is a vibrating axisymmetric resonator sensor of the MEMS type, the resonator being formed by a mass/spring system.

Figure 1:
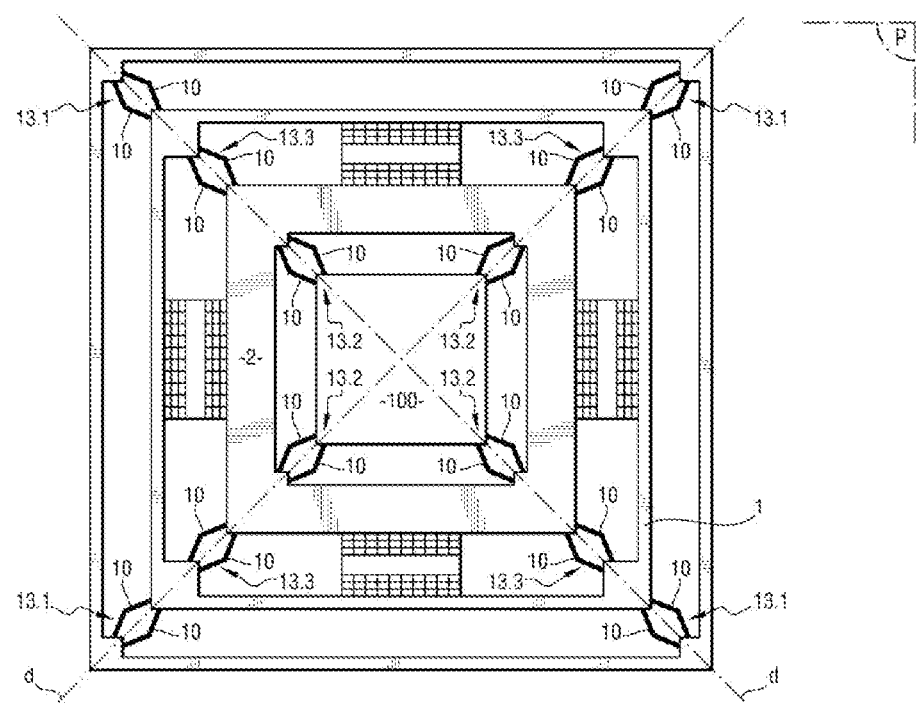
FIG. 1 is a schematic, top view of an angular sensor according to a first embodiment of the invention.
Figure 2:
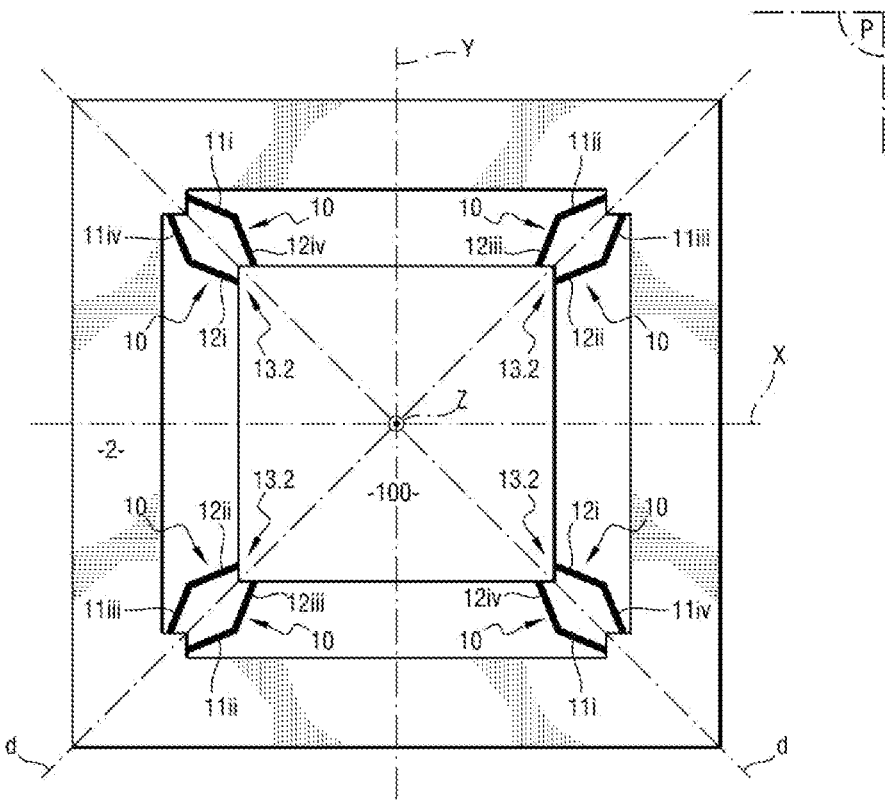
FIG. 2 is a schematic, enlarged view illustrating the arrangement of the means for suspending the second mass with respect to the frame in this first embodiment.

In reference to FIGS. 1 and 2, the angular sensor comprises a frame 100, a first mass 1 and a second mass 2 (also called seismic bodies) which are concentric to one another, and means for suspending masses. The sensor is made here by etching a silicon wafer.

The masses 1, 2 each have the shape of a square frame. The first mass 1 surrounds the second mass 2 such that the first mass 1 has diagonals d combined with diagonals d of the second mass 2 when the sensor is not used. The masses 1 and 2 have combined centres of gravity and have one same mass value.

The suspension means comprise mechanical springs 10. The mechanical springs 10 each include a first elastic leaf 11 and a second elastic leaf 12 which are connected to one another by an end. The springs 10 extend into the suspension plane P which is parallel to the diagonals d and enable, for each of the masses 1, 2, three degrees of freedom in the plane P (namely two translations along the axes x and y, and a rotation about the axis z perpendicular to the two first axes) by prohibiting the other degrees of freedom (i.e. that the masses 1, 2 can only be moved with respect to the frame parallel to the plane P).

The springs are symmetrically arranged in pairs 13 themselves disposed symmetrically against one another, namely:

four first pairs 13.1 of springs 10, of which the first elastic leaves 11 have an end connected to the first mass 1 and the second elastic leaves 12 have an end connected to the frame 100, four second pairs 13.2 of springs 10, of which the first elastic leaves 11 have an end connected to the second mass 2 and the second elastic leaves 12 have an end connected to the frame 100, four third pairs 13.3 of springs 10, of which the first elastic leaves 11 have an end connected to the first mass 1 and the second elastic leaves 12 have an end connected to the second mass 2.

Thus:

the first set of springs 10 constituted by the four first pairs 13.1 of springs 10 connects the first mass 1 to the frame 100 and ensures the suspension of the first mass 1 with respect to the frame 100;

the second set of springs 10 constituted by the four second pairs 13.2 of springs 10 connects the second mass 2 to the frame 100 and ensures the suspension of the second mass 2 with respect to the frame 100;

the third set of springs 10 constituted by the four third pairs 13.3 of springs 10 connects the first mass 1 to the second mass 2 and ensures a mechanical coupling of the first mass 1 and of the second mass 2.

The springs 10 of each pair 13.1, 13.2, 13.3 of springs 10 each extend from one side of one of the diagonals d such that, in each pair 13.1, 13.2, 13.3 of springs 10, the springs 10 are disposed symmetrically with respect to the diagonal d extending between them.

In each pair 13.1, 13.2, 13.3 of springs 10, the first elastic leaf 11 of one of the springs 10 is parallel to the second elastic leaf 12 of the other of the springs 10 and conversely.

In each pair 13.1, 13.2, 13.3 of springs 10, the four elastic leaves 11, 12 comprise two pairs of adjacent leaves, together forming an angle of around 45°.

More specifically, in the first embodiment, the first elastic leaves 11 of each pair of springs 10, together form the angle of 45° and the second elastic leaves 12 of each pair of springs 10, together form the angle of 45°. In other words, the first elastic leaves 11 of each pair 13.1, 13.2, 13.3 of springs 10 form an angle of 22.5° with respect to the diagonal d passing between the springs 10 of said pair and the second elastic leaves 12 of each pair 13.1, 13.2, 13.3 of springs 10 form an angle of 22.5° with respect to the diagonal d passing between the springs 10 of said pair. The first elastic leaf 11 and the second elastic leaf 12 of each spring 10 thus together form, a convex angle of 135° oriented towards the other spring 10 of the same pair. It will be noted that "convex" and "concave" are used to identify the sides of two elastic leaves connected to one another: thus, the two elastic leaves, together form, on one side, a convex angle of 135° and, on the other side, a concave angle of 360°-135°, that is 225°.

It is noted in FIG. 2 that, for each second pair 13.2, the first elastic leaf 11 of one of the springs 10 is:

(in the same pair 13.2) parallel to the second elastic leaf 12 of the other spring 10;

(in the other pair 13.2 aligned on the same diagonal d as the second pair 13.2 in question) parallel to the second elastic leaf 12 of the spring 10, which is located on the same side of the diagonal d and parallel to the first elastic leaf 11 of the spring 10 located on the opposite side of the diagonal d;

(in the second pair 13.2 which is the closest and which is aligned on the other diagonal d) perpendicular to the second elastic leaf 12 of the spring 10 which is located closest and to the first opposite elastic leaf 11;

(in the second pair 13.2 which is the most remote and which is aligned on the other diagonal d) perpendicular to the first elastic leaf 11 of the spring 10 closest and to the second elastic leaf 12 of the most remote spring 10.

To simplify, all the elastic leaves parallel to one another will be based on the indices i, ii, iii, iv.

The stiffness of the elastic leaves i impacts on the component in cosine of the overall stiffness of all the springs 10, the stiffness of the elastic leaves ii impacts on the component in sine, the stiffness of the elastic leaves iii impacts on the component in -cosine, and the stiffness of the elastic leaves iv impacts on the component in -sine. The stiffness conditions the frequency anisotropy, such that the adjustment of the stiffness makes it possible to compensate for the frequency anisotropy and therefore to improve the precision of the sensor.

The same stiffness will be allocated to the elastic leaves parallel to one another. The correction of stiffness can be obtained by:

a local reduction of the cross-section of the springs by laser etching;

an addition or a removal of mass localised by deposition or etching;

a localised oxidation of the silicon;

a localised diffusion of a material in the silicon.

The latter method is implemented in the following way:

previous deposition, on the elastic leaves, of which the stiffness is desired to be modified, of a material that is diffusible in silicon at a moderate temperature, that is around 300° C. The diffusion increases the Young's modulus of silicon.

adjustment of the frequency on an axis by a controlled heating of the metallised leaves having the correct orientation by a passage of current or under an infrared beam.

The adjustment of stiffness is done by couples according to the diagonals d. Each couple comprises the first pair 13.1 of each diagonal d and the second opposite pair 13.2.

Figure 3:
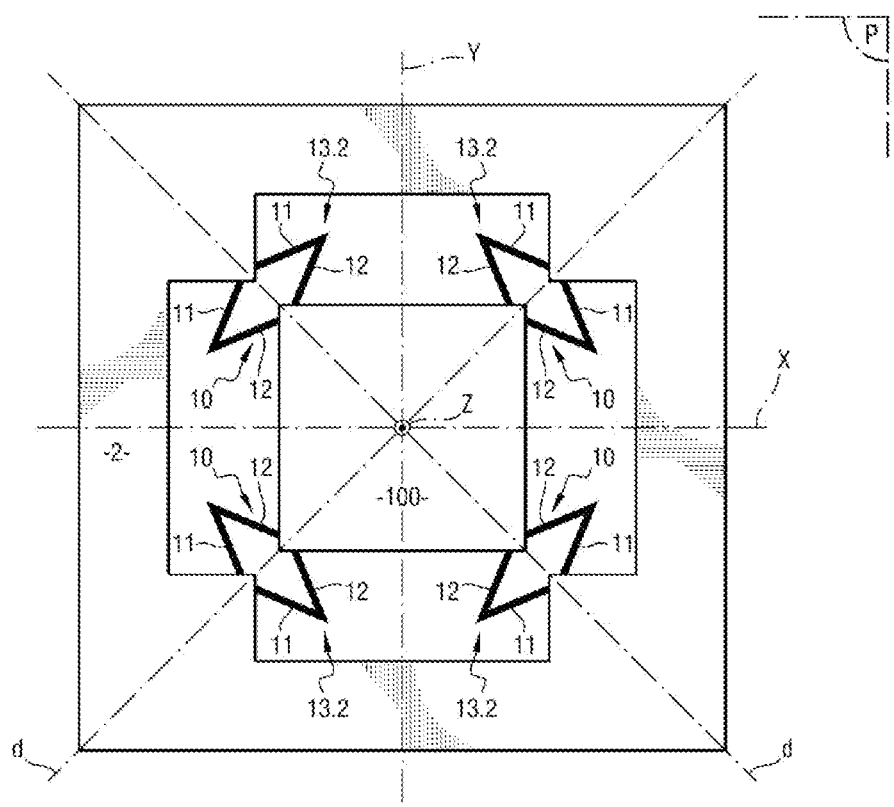
FIG. 3 is a schematic, enlarged view illustrating the arrangement of the means for suspending the second mass with respect to the frame in a second embodiment of the invention.

In the second embodiment represented in FIG. 3, the first elastic leaf 11 and the second elastic leaf 12 of each spring 10, together form the convex angle of 45°, this angle being oriented towards the other spring 10 of the same pair. In each pair of springs 10, the first elastic leaves 11, together form an angle of 135° and the second elastic leaves 12, together form an angle of 135°.

The method for adjusting the frequency anisotropy is identical.

The two arrangements proposed optically respect the axisymmetric constraints and crystalline symmetry of the silicon, in which the sensor is etched.

The frequency in translation/frequency in rotation ratios of these two structures are very different, and the choice between these two structures will be made according to the differences in frequency between the specific modes.

Of course, the invention is not limited to the embodiment described, but comprises any variant entering into the field of the invention, such as defined by the claims.

In particular, the sensor can have a structure, different from that described.

Although in the embodiments, all the pairs are arranged according to the first embodiment or the second embodiment, it is possible to mix the embodiment in one same sensor. For example, the first pairs 13.1 and the second pairs 13.2 comply with the first embodiment and the third pairs 13.3 comply with the second embodiment.

Furthermore, only some of the pairs of springs can have leaves at 45°, the leaves of the other pairs of springs extending to 90°. For example:

only the leaves of the pairs 13.3 are at 45°, the leaves of the pairs 13.1, 13.2 being at 90° (the sensor could thus comprise at least one electrostatic spring extending between the frame and the first mass and/or between the frame and the second mass), or only the leaves of the pairs 13.1, 13.2 are at 45°, the leaves of the pairs 13.3 being at 90° (the sensor could thus comprise at least one electrostatic spring extending between the masses).

Although more difficult to achieve, the concave side of the angle formed by the elastic leaves 11, 12 of each spring 10 of each pair 13.1, 13.2, 13.3 can be oriented towards the spring 10 of the same pair.

The angle must be as close as possible to 45°, given the manufacturing constraints.

The invention claimed is:

1. Angular sensor with a vibrating resonator, comprising a frame, a first mass and a second mass which are concentric, and means for suspending the masses with respect to the frame, wherein the masses are connected to mechanical springs arranged symmetrically in pairs of springs, themselves arranged symmetrically against one another, in that each spring comprises a first elastic leaf and a second elastic leaf connected to one another by an end, in that the first elastic leaf of one of the springs of each pair of springs is parallel to the second elastic leaf of the other of the springs of the same pair of springs, in that the four elastic leaves of at least one of the pairs of springs comprise two pairs of adjacent leaves, together forming an angle of around 45°, and in that the sensor has no electrostatic spring between the elements connected by said at least one of the pairs of springs comprising the two pairs of adjacent leaves, together forming an angle of around 45°.

2. The angular sensor according to claim 1, wherein the pairs of springs comprise four first pairs of springs, of which the first leaves are connected to the first mass and the second leaves are connected to the frame, and four second pairs of springs, and the first leaves are connected to the second mass and the second leaves are connected to the frame.

3. The angular sensor according to claim 2, wherein the leaves of the springs of the first pairs of springs have adjacent leaves, together forming an angle of around 45°.

4. The angular sensor according to claim 2, wherein the springs of the second pairs of springs have adjacent leaves, together forming an angle of around 45°.

5. The angular sensor according to claim 2, wherein the pairs of springs comprise four third pairs of springs, wherein the first leaves are connected to the first mass and the second leaves are connected to the second mass.

6. The angular sensor according to claim 5, wherein the leaves of the springs of the third pairs (13.3) of springs have adjacent leaves, together forming an angle of around 45°.

7. The angular sensor according to claim 1, wherein the first elastic leaves of said at least one of the pairs of springs, together form the angle of 45° and the second elastic leaves of said at least one of the pairs of springs, together form the angle of 45°.

8. The angular sensor according to claim 1, wherein the first elastic leaf and the second elastic leaf of each spring of said at least one of the pairs of springs, together form the angle of 45°.

9. The angular sensor according to claim 1, wherein the elastic leaves of each spring, together form a convex angle oriented towards the other spring of the same pair.

10. The angular sensor according to claim 1, wherein the masses have a square frame shape, the first mass having diagonals (d) combined with diagonals (d) of the second mass, and the springs of each pair of springs each extend on one side of one of the diagonals (d).

11. The angular sensor according to claim 1, wherein the four elastic leaves of at least one of the pairs comprises two pairs of adjacent elastic leaves, together forming an angle of around 45°.

\* \* \* \* \*